US009837836B2

(12) United States Patent
Li et al.

(10) Patent No.: US 9,837,836 B2
(45) Date of Patent: Dec. 5, 2017

(54) CHARGING METHOD USING COMPENSATION IMPEDANCE IN CV CHARGING MODE

(71) Applicant: ASUSTeK COMPUTER INC., Taipei (TW)

(72) Inventors: Ching-Han Li, Taipei (TW); Hsiang-Jui Hung, Taipei (TW); Wei-Chen Tu, Taipei (TW); Ming-Ting Tsai, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 222 days.

(21) Appl. No.: 14/751,166

(22) Filed: Jun. 26, 2015

(65) Prior Publication Data

US 2016/0218542 A1 Jul. 28, 2016

(30) Foreign Application Priority Data

Jan. 23, 2015 (TW) .............................. 104102324 A

(51) Int. Cl.
 *H02J 7/00* (2006.01)
(52) U.S. Cl.
 CPC ............ *H02J 7/0029* (2013.01); *H02J 7/007* (2013.01); *H02J 7/0083* (2013.01); *H02J 2007/0037* (2013.01)
(58) Field of Classification Search
 CPC ........ H02J 7/0029; H02J 7/007; H02J 7/0083; H02J 7/0057; H02J 2007/0059; H02J 2007/0037
 See application file for complete search history.

(56) References Cited

U.S. PATENT DOCUMENTS

| 5,789,924 A | 8/1998 | Okada |
| 8,421,416 B2 | 4/2013 | Hsu et al. |
| 2009/0261786 A1* | 10/2009 | Hsu ..................... H02J 7/0072 320/162 |

(Continued)

FOREIGN PATENT DOCUMENTS

| FI | 20145324 | * | 3/2014 |
| TW | I323965 | | 4/2010 |

*Primary Examiner* — Drew A Dunn
*Assistant Examiner* — Sailesh Thapa
(74) *Attorney, Agent, or Firm* — JCIPRNET

(57) ABSTRACT

A charging method and a portable electronic device using the same are provided. The charging method includes following steps: detecting a battery voltage and a charging current of a battery module; determining whether the portable electronic device operates at a constant voltage (CV) charging mode; executing an impedance calculation at the CV charging mode to obtain a first battery voltage corresponding to a first predetermined current and a second battery voltage corresponding to a second predetermined current; calculating a compensation impedance according to the predetermined current and the battery voltages; setting a maximum charging voltage according to the compensation impedance and executing a CV charging to the battery module accordingly; determining whether a current variation of the charging current is larger than a threshold value; re-executing the impedance calculation; updating a setting value of the maximum charging voltage when the current variation is larger than the threshold value.

15 Claims, 3 Drawing Sheets

(56) References Cited

U.S. PATENT DOCUMENTS

2015/0054449 A1* 2/2015 Takano ............... H01M 10/443
  320/107
2015/0309122 A1* 10/2015 Rajamaki ........... G01R 31/3662
  324/430

* cited by examiner

CHARGING METHOD USING COMPENSATION IMPEDANCE IN CV CHARGING MODE

CROSS-REFERENCE TO RELATED APPLICATION

This application claims the priority benefit of Taiwan application serial No. 104102324, filed on Jan. 23, 2015. The entirety of the above-mentioned patent application is hereby incorporated by reference herein and made a part of specification.

BACKGROUND OF THE INVENTION

Field of the Invention

The invention relates to a power supply technology and, more particularly, to a charging method for a portable electronic device and a portable electronic device using the same.

Description of the Related Art

As science technology develops, various portable electronic devices, such as a tablet computer, a personal digital assistant (PDA), a laptop computer and a smart phone, become necessary in daily life.

In a portable electronic device, a battery with large capacity needs longer charging time to charge. Thus, the charging efficiency needs to be improved in consideration of the battery capacity and the charging time.

A conventional battery module is first charged at a pre-charging mode when the battery module is at low power. When the power or the battery voltage is above a level, the battery module is charged at a constant current (CC) mode. When the battery voltage is nearly fully charged, the battery module is charged at a constant voltage (CV) charging mode or a trickle charging mode until the charging of the battery module is finished.

In the process of charging the portable electronic device, the CV charging mode is longer. The setting of a maximum charging voltage at the CV charging mode affects the CV charging time. Conventionally, the maximum charging voltage is preset to a constant value, which makes the charging speed of the battery module low.

BRIEF SUMMARY OF THE INVENTION

A charging method for a portable electronic device and a portable electronic device are provided, which dynamically adjusts a setting value of a maximum charging voltage at a CV charging mode to shorten the charging time at the CV charging mode and improve the charging speed of a battery module.

A charging method for a portable electronic device is adapted to receiving an input current and charging a battery module of the portable electronic device. The charging method includes following steps: detecting a battery voltage and a charging current of the battery module; determining whether the portable electronic device operates at a CV charging mode according to the battery voltage; executing an impedance calculation to obtain a first battery voltage corresponding to a first predetermined current and a second battery voltage corresponding to a second predetermined current of the battery module when the portable electronic device operates at the CV charging mode; calculating a compensation impedance according to the first predetermined current, the second predetermined current, the first battery voltage and the second battery voltage; setting a maximum charging voltage according to the compensation impedance and executing a CV charging to the battery module; determining whether a current variation of the charging current is larger than a threshold value; re-executing the impedance calculation; and updating a setting value of the maximum charging voltage when the current variation is larger than the threshold value.

A portable electronic device includes a function module, a battery module and a charging control module. The battery module is coupled to the function module to provide power to the function module. The charging control module is coupled to the battery module to charge the battery module according to an input current. The charging control module detects a battery voltage and a charging current of the battery module, and determines whether the portable electronic device operates at a CV charging mode according to the battery voltage. When the portable electronic device operates at the CV charging mode, the charging control module executes an impedance calculation to obtain a first battery voltage corresponding to a first predetermined current and a second battery voltage corresponding to a second predetermined current of the battery module, and calculates a compensation impedance according to the first battery voltage and the second battery voltage, and the charging control module sets a maximum charging voltage according to the compensation impedance, executes a CV charging to the battery module, and determines whether a current variation of the charging current is larger than a threshold value. When the current variation is larger than the threshold value, the charging control module re-executes the impedance calculation to update a setting value of the maximum charging voltage.

In sum, the charging method for the portable electronic device and the portable electronic device using the same are provided. In the charging method, the compensation impedance corresponding to the current internal resistor of the battery module is calculated, and the corresponding maximum charging voltage is set. Each time when the charging current decreases a level, the compensation impedance is recalculated and the maximum charging voltage is reset to ensure that the maximum charging current is provided to charge the battery module at the CV charging mode. Consequently, no matter what the actual internal resistor of the battery module is or how the actual internal resistor changes, the charging method dynamically adjusts the setting value of the maximum charging voltage, and thus the CV charging time is shorted and the charging speed of the battery module is improved.

These and other features, aspects and advantages of the present invention will become better understood with regard to the following description, appended claims, and accompanying drawings.

DETAILED DESCRIPTION OF THE EMBODIMENTS

The invention is illustrated with embodiments in the following. The elements, components or steps with the same symbols represent the same or similar components or steps.

Figure 1:
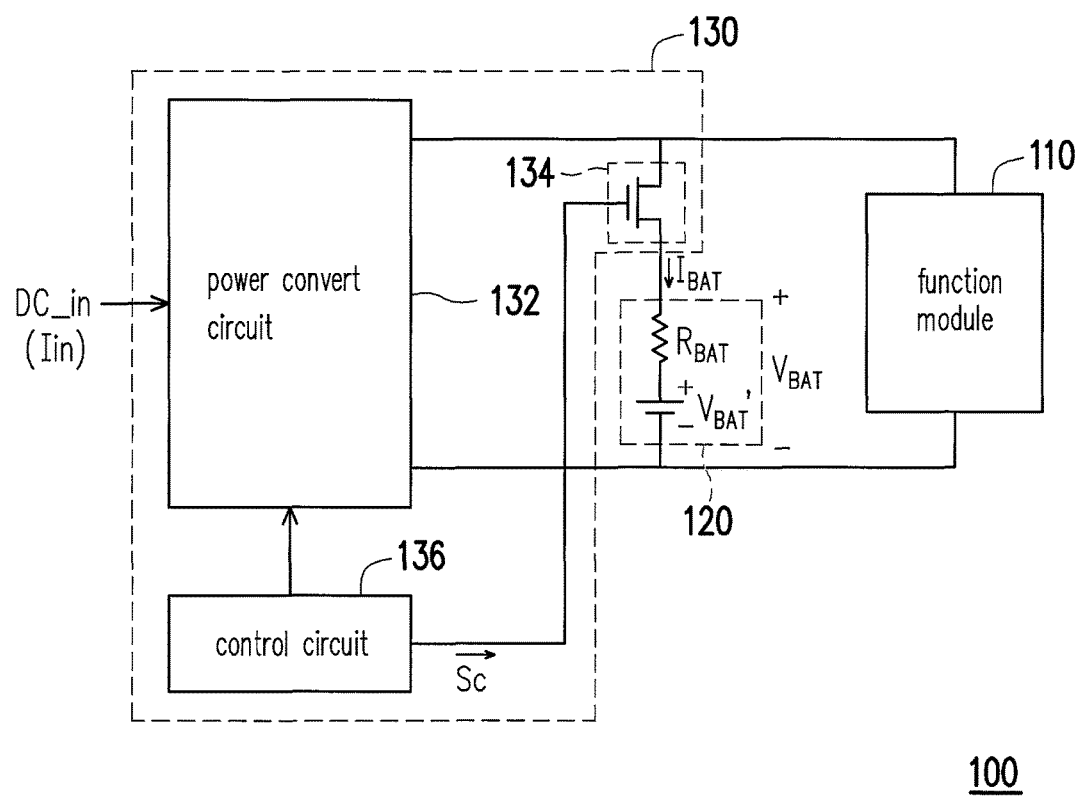
FIG. 1 is a schematic diagram showing a portable electronic device in an embodiment.

FIG. 1 is a schematic diagram showing a portable electronic device in an embodiment. Please refer to FIG. 1, the portable electronic device 100 receives a direct current (DC) power DC_in or an input current Iin (which is provided by a power adapter), and the portable electronic device 100 converts the DC power DC_in or the input current Iin to a working power supply which is provided to an inner circuit or a battery module. The portable electronic device 100 is a notebook computer, a tablet computer, a smart phone, a personal digital assistant (PDA) or a game machine, which is not limited herein.

In the embodiment, the portable electronic device 100 receives an alternating current (AC) power supply from a power adaptor (not shown), and the portable electronic device 100 converts the AC power supply to a DC power for the portable electronic device 100.

In detail, the portable electronic device 100 includes a function module 110, a battery module 120 and a charging control module 130. The function module 110 is a hardware component of the portable electronic device 100 to provide functions, and the function module 110 includes a central processing unit (CPU), a chipset, a memory and a hard disk. The battery module 120 is a main power supply for the portable electronic device 100 when the portable electronic device 100 is not connected to an external AC power supply via the power adaptor. When the portable electronic device 100 is connected to an AC power supply, the battery module 120 is charged under the control of the charging control module 130.

The charging control module 130 is coupled to the battery module 120. When the power adaptor is connected to a power input, the charging control module 130 receives the power from the power adaptor and provides the power to the function module 110 and charges the battery module 120. In detail, in the charging process of the battery module 120, the charging control module 130 detects a battery voltage $V_{BAT}$ and a charging current $I_{BAT}$ of the battery module 120 and dynamically adjusts a maximum charging voltage at a CV charging mode, so as to reduce the impedance effect due to an internal resistor (such as $R_{BAT}$) of the battery module 120 to improve the charging speed.

In detail, the charging control module 130 includes a power convert circuit 132, a power switch 134 and a control circuit 136. The power convert circuit 132 receives the DC power DC_in, and converts the DC power DC_in to a working power supply under the control of the control circuit 136. The power switch 134 is coupled to the power convert circuit 132 to receive the working power supply. The power switch 134 switches according to a control signal Sc provided by the control circuit 136, so as to control the working power supply provided to the battery module 120. The charging of the battery module 120 changes according to the control signal Sc of the control circuit 136. The control circuit 136 controls the power conversion of the power convert circuit 132 and provides the control signal Sc to control the switching of the power switch 134. The control circuit 136 detects the battery voltage $V_{BAT}$ and the charging current $I_{BAT}$ of the battery module 120 as a basis for adjusting the control signal Sc.

Figure 2:
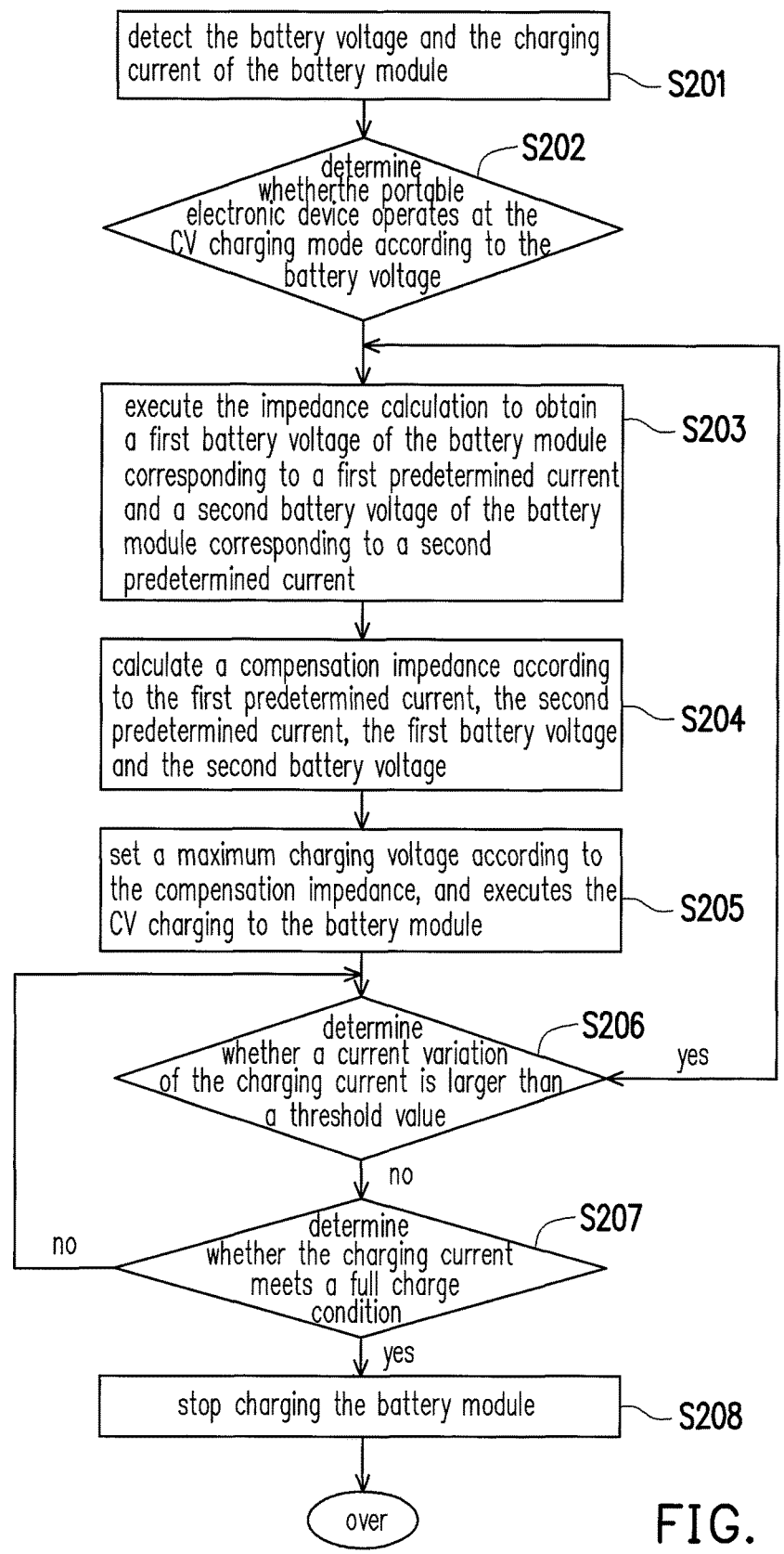
FIG. 2 is a flow chart showing a charging method for a portable electronic device in an embodiment.

With the configuration stated above, the charging control module 130 executes the steps in FIG. 2. FIG. 2 is a flow chart showing a charging method for a portable electronic device in an embodiment.

Please refer to FIG. 1 and FIG. 2, first, the charging control module 130 detects the battery voltage $V_{BAT}$ and the charging current $I_{BAT}$ of the battery module (step S201), and determines whether the portable electronic device 100 operates at the CV charging mode according to the battery voltage $V_{BAT}$ (step S202). When the charging control module 130 determines the portable electronic device 100 does not operate at the CV charging mode, it means that the portable electronic device 100 operates at a pre-charge mode, a constant current mode (CC) mode or the portable electronic device 100 is fully charged. When the charging control module 130 determines the portable electronic device 100 operates at the CV charging mode, the charging control module 130 executes the impedance calculation to obtain a first battery voltage of the battery module 120 corresponding to a first predetermined current and a second battery voltage of the battery module 120 corresponding to a second predetermined current (step S203).

Then, the charging control module 130 calculates a compensation impedance according to the first predetermined current, the second predetermined current, the first battery voltage and the second battery voltage (step S204) sets a maximum charging voltage according to the compensation impedance, and executes the CV charging to the battery module 120 accordingly (step S205). In the period of the CV charging, the charging control module 130 continuously detects and determines whether a current variation of the charging current $I_{BAT}$ is larger than a threshold value (step S206).

If the charging control module 130 determines the current variation is not larger than the threshold value, the charging control module 130 further determines whether the charging current $I_{BAT}$ meets a full charge condition (fully charged) (step S207). When the charging current $I_{BAT}$ meets the full charge condition, the charging control module 130 stops charging the battery module 120 (step S208). On the other hand, if the charging control module 130 determines the current variation is larger than the threshold value, it means the internal resistor $R_{BAT}$ of the battery module 120 changes with the environment or the battery voltage $V_{BAT}$. Then, the charging control module 130 executes the step S203 again to execute the impedance calculation, calculates the current compensation impedance, and updates the setting value of the maximum charging voltage according to the compensation impedance in step S204 and S205.

In the charging method, the charging control module 130 calculates a compensation impedance corresponding to the current internal resistor $R_{BAT}$ of the battery module 120 at the CV charging mode, sets the corresponding maximum charging voltage, and re-calculates the compensation impedance and resets the maximum charging voltage each time when the charging current $I_{BAT}$ decreases a level. Thus, regardless of the value of the actual internal resistor $R_{BAT}$ of the battery module 120 and the change of the actual internal resistor $R_{BAT}$, since the charging control module 130 periodically calculates the compensation impedance corresponding to the internal resistor $R_{BAT}$ and dynamically adjusts the setting value of the maximum charging voltage, the charging control module 130 provides the maximum charging current $I_{BAT}$ to charge the battery module 120 at the CV charging mode until the charging of the battery module 120 is finished, and the CV charging is faster.

In detail, in the charging method, by determining whether the battery voltage $V_{BAT}$ is greater than or equals to the full charge voltage and whether the input current Iin is less than the maximum current threshold value, the control circuit 136 determines whether the portable electronic device 100 operates at the CV charging mode and determines whether the power convert circuit 132 is at a full load state. When the battery voltage $V_{BAT}$ is greater than or equals to the full charge voltage and the input current Iin is less than the maximum current threshold value, the control circuit 136 determines the portable electronic device 100 operates at the CV charging mode and the power convert circuit 132 is not at the full load state. On the contrary, when the battery voltage $V_{BAT}$ is less than the full charge voltage, it means that the portable electronic device 100 operates at the pre-charge mode or the CC charging mode. When the input current Iin is greater than or equals to the maximum current threshold value, it means the power convert circuit 132 is at the full load state. Thus, when the battery voltage is less than the full charge voltage or the input current is greater than or equals to the maximum current threshold value, the control circuit 136 determines that the portable electronic device 100 does not operate at the CV charging mode or the power convert circuit 132 is at the full load state, and the control circuit 136 does not executes steps S202 to S208.

Figure 3:
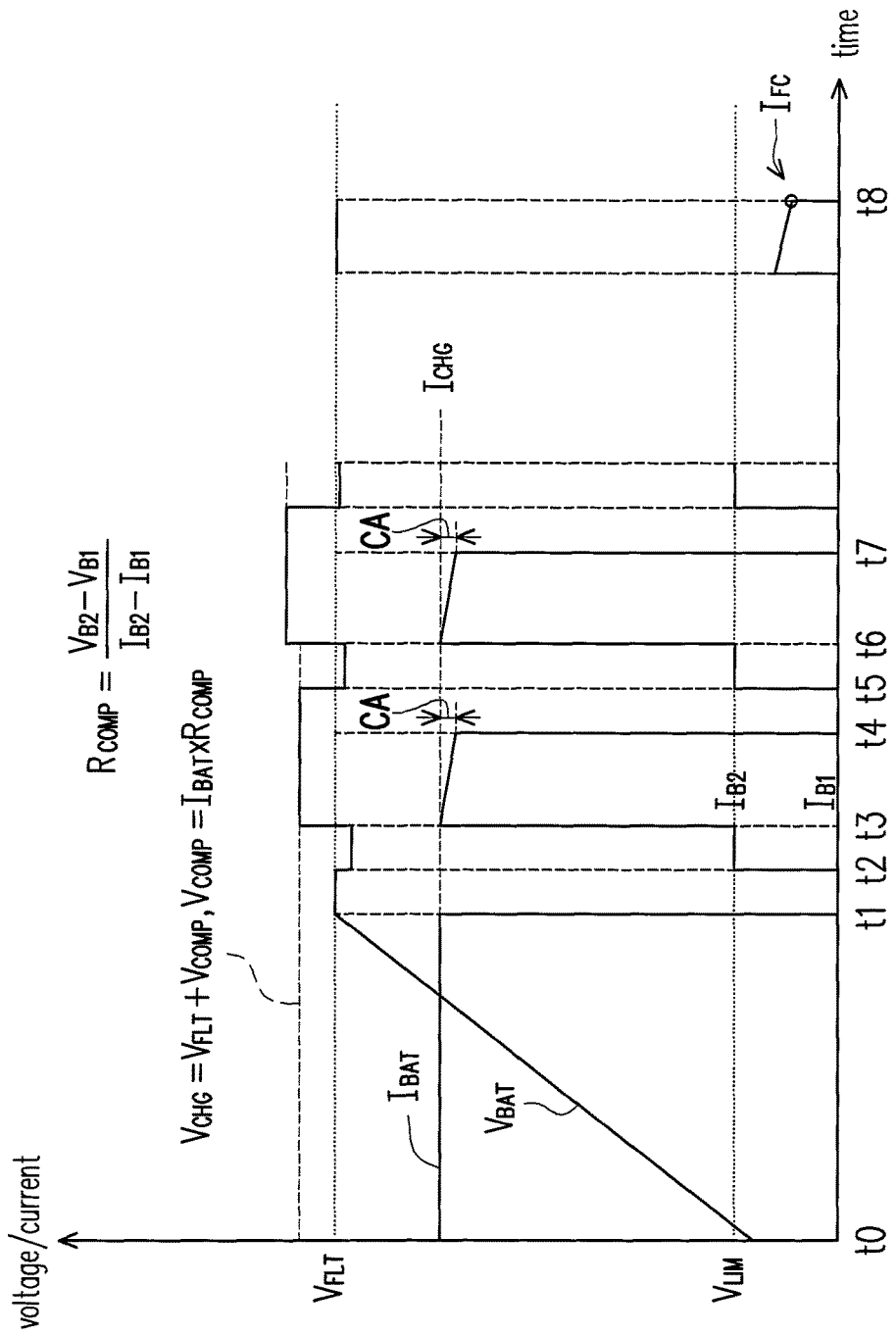
FIG. 3 shows a charging sequence of a portable electronic device in an embodiment.

FIG. 3 is a charging sequence chart of a portable electronic device in an embodiment. Please refer to FIG. 2 and FIG. 3, first, in the period t0 to t1, the control circuit 136 detects that the battery voltage $V_{BAT}$ is less than the full charge voltage $V_{FLT}$ and controls the operation of the power convert circuit 132 via the CC charging mode. As a result, the power convert circuit 132 executes the CC charging to the battery module 120 with the maximum charging current $I_{CHG}$ during the period t0 to t1.

At the CC charging mode, the battery voltage $V_{BAT}$ increases gradually from the voltage low limit $V_{LIM}$ (such as 3V) until the control circuit 136 detects that the battery voltage $V_{BAT}$ equals to the full charge voltage $V_{FLT}$ at the time point t1, and the control circuit 136 further determines whether the input current Iin is less than the maximum current threshold value at the time point t1. If the input current Iin is not greater than the maximum current threshold value (which means the power convert circuit 132 is not at the full load state), the control circuit 136 determines the portable electronic device 100 enters the CV charging mode, and the impedance calculation is executed in step S203 during the period t1 to t3.

While impedance calculation, the control circuit 136 controls the power convert circuit 132 to stop charging (which means providing zero current to the battery module 120) during the period t1 to t2, and the control circuit 136 detects the battery voltage $V_{BAT}$ and the charging current $I_{BAT}$ after the battery voltage $V_{BAT}$ becomes stable (For example, the battery voltage $V_{BAT}$ is detected 10 s after the charging is stopped). The control circuit 136 takes the battery voltage $V_{BAT}$ as the first battery voltage $V_{B1}$ and takes the charging current $I_{BAT}$ as the first charging current $I_{B1}$ (the first charging current $I_{B1}$ is 0 in the embodiment) to calculate the compensation impedance $R_{COMP}$. Since no current flows through the battery module 120 during the period t1 to t2, the battery voltage $V_{BAT}$ detected by the control circuit 136 represents the actual voltage $V_{BAT}'$ of the battery module 120.

Then, the control circuit 136 charges the battery module 120 with another predetermined current (such as 500 mA) during the period t2 to t3 and detects the battery voltage $V_{BAT}$ and the charging current $I_{BAT}$ in the period t2 to t3 as the second battery voltage $V_{B2}$ and the second charging current $I_{B2}$, respectively, to calculate the compensation impedance $R_{COMP}$.

After the first battery voltage $V_{B1}$, the second battery voltage $V_{B2}$, the first charging current $I_{B1}$ and the second charging current $I_{B2}$ are obtained, the control circuit 136 calculates a voltage difference ($V_{B2}-V_{B1}$) between the first battery voltage $V_{B1}$ and the second battery voltage $V_{B2}$, calculates the current difference ($I_{B2}-I_{B1}$) between the first charging current $I_{B1}$ and the second charging current $I_{B2}$, and calculates the compensation impedance $R_{COMP}$ according to the voltage difference and the current difference. The compensation impedance $R_{COMP}$ is represented by the formula (1):

$$R_{COMP}=(V_{B2}-V_{B1})/(I_{B2}-I_{B1}) \qquad (1)$$

After the control circuit 136 calculates the compensation impedance $R_{COMP}$, a compensation voltage $V_{COMP}$ is calculated according to the compensation impedance $R_{COMP}$, and the maximum charging voltage $V_{CHG}$ is set according to the full charge voltage $V_{FLT}$ and the compensation voltage $V_{COMP}$. The compensation voltage $V_{COMP}$ and the maximum charging voltage are represented by formulas (2) and (3), respectively:

$$V_{COMP}=I_{BAT} \times R_{COMP} \qquad (2)$$

$$V_{CHG}=VFLT+V_{COMP} \qquad (3)$$

After the maximum charging voltage $V_{CHG}$ is set, the control circuit 136 conducts the power switch 134, and controls the power convert circuit 132 to execute the CV charging to the battery module 120 according to the maximum charging voltage $V_{CHG}$. During the CV charging period t3 to t4, the charging current $I_{BAT}$ decreases gradually. At the moment, the control circuit 136 continuously detects and determines whether the current variation CA of the charging current $I_{BAT}$ is larger than the threshold value (such as 100 mA) (step S206).

In the embodiment, the control circuit 136 determines that the current variation CA of the charging current $I_{BAT}$ is larger than the threshold value at the time point t4, and the charging current $I_{BAT}$ is not less than the full current $I_{FC}$. Thus, the control circuit 136 executes the impedance calculation during the period t4 to t6, and updates the setting value of the maximum charging voltage $V_{CHG}$ at the time point t6 according to the compensation impedance $R_{COMP}$. The power convert circuit 132 is controlled by the control circuit 136 to execute the CV charging to the battery module 120 with the maximum charging voltage $V_{CHG}$ during the period t6 to t7 until the control circuit 136 determines the current variation CA of the charging current $I_{BAT}$ is larger than the threshold value again (such as at the time point t7).

The charging current $I_{BAT}$ gradually decreases by repeating the previous steps until that the control circuit 136 detects the charging current $I_{BAT}$ is less than the full current $I_{FC}$ at the time point t8, which means the charging of the battery module 120 is finished. The control circuit 136 determines that the charging current $I_{BAT}$ meets the full charge condition, and controls the power convert circuit 132 to stop charging the battery module 120 (step S208).

In the impedance calculation, the predetermined current provided during the period t1 to t2 is not limited to zero current, and the predetermined current is set according to requirements. In another embodiment, the control circuit 136 provides a non-zero predetermined current during the period t1 to t2 and detects the first battery voltage $V_{B1}$ and the first charging current $I_{B1}$. In other words, as long as the control circuit 136 charges the battery module 120 with different predetermined current in two different periods and detects the battery voltage and the charging current in the periods as a basis for calculating the compensation impedance, it is within the scope of the impedance calculation.

In sum, the charging method for the portable electronic device and the portable electronic device using the same are provided. In the charging method, the compensation impedance corresponding to the current internal resistor of the battery module is calculated, and the corresponding maximum charging voltage is set. Each time when the charging current decreases a level, the compensation impedance is recalculated and the maximum charging voltage is reset to ensure that the maximum charging current is provided to charge the battery module at the CV charging mode. Consequently, no matter what the actual internal resistor of the battery module is or how the actual internal resistor changes, the charging method dynamically adjusts the setting value of the maximum charging voltage, and thus the CV charging time is shorted and the charging speed of the battery module is improved.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A charging method for a portable electronic device, adapted to receive an input current and charge a battery module of the portable electronic device, the charging method comprising following steps:
    detecting a battery voltage and a charging current of the battery module;
    determining whether the portable electronic device operates at a constant voltage (CV) charging mode according to the battery voltage;
    executing an impedance calculation to obtain a first battery voltage corresponding to a first predetermined current and a second battery voltage corresponding to a second predetermined current of the battery module when the portable electronic device operates at the CV charging mode;
    calculating a compensation impedance according to the first predetetermined current, the second predetermined current, the first battery voltage and the second battery voltage;
    setting a maximum charging voltage according to the compensation impedance and executing a CV charging to the battery module;
    determining whether a current variation of the charging current is larger than a threshold value; and
    re-executing the impedance calculation to recalculate the compensation impedance in the CV charging mode and updating a setting value of the maximum charging voltage according to the recalculated compensation impedance when the current variation is larger than the threshold value.

2. The charging method for the portable electronic device according to claim 1, wherein the step of executing the impedance calculation to obtain the first battery voltage corresponding to the first predetermined current and the second battery voltage corresponding to the second predetermined current of the battery module includes:
    charging the battery module with the first predetermined current during a first period;
    detecting the battery voltage in the first period as the first battery voltage, and detecting the charging current in the first period as a first charging current;
    charging the battery module with the second predetermined current during a second period; and
    detecting the battery voltage in the second period as the second battery voltage, and detecting the charging current in the second period as a second charging current.

3. The charging method for the portable electronic device according to claim 2, wherein the value of the first predetermined current is zero, and the first battery voltage is an actual voltage of the battery module.

4. The charging method for the portable electronic device according to claim 1, wherein the step of calculating the compensation impedance according to the first predetermined current, the second predetermined current, the first battery voltage and the second battery voltage includes:
    calculating a voltage difference between the first battery voltage and the second battery voltage;
    calculating a current difference between the first charging current and the second charging current; and
    calculating the compensation impedance according to the voltage difference and the current difference.

5. The charging method for the portable electronic device according to claim 1, wherein the step of setting the maximum charging voltage according to the compensation impedance and executing the CV charging to the battery module includes:
    calculating product of the charging current and the compensation impedance to obtain a compensation voltage; and
    setting the maximum charging voltage to be as a sum of a full charge voltage and the compensation voltage.

6. The charging method for the portable electronic device according to claim 1, wherein the step of determining whether the portable electronic device operates at the CV charging mode according to the battery voltage includes:
    determining whether the battery voltage is greater than or equals to a full charge voltage and whether the input current is less than a maximum current threshold value;
    determining that the portable electronic device operates at the CV charging mode when the battery voltage is greater than or equals to the full charge voltage and the input current is less than the maximum current threshold value; and
    determining that the portable electronic device does not operate at the CV charging mode when the battery voltage is less than the full charge voltage or the input current is greater than or equals to the maximum current threshold value.

7. The charging method for the portable electronic device according to claim 1, wherein the charging method further includes:
    determining whether the charging current meets a full charge condition;
    stopping charging the battery module when the charging current meets the full charge condition; and
    repeating the step of determining whether the current variation is larger than the threshold value when the charging current does not meet the full charge condition.

8. A portable electronic device, comprising:
    a function module;
    a battery module coupled to the function module to provide power to the function module; and
    a charging control module coupled to the battery module to charge the battery module according to an input current, wherein the charging control module detects a battery voltage and a charging current of the battery module, and determines whether the portable electronic device operates at a constant voltage (CV) charging mode according to the battery voltage, wherein when the portable electronic device operates at the CV charging mode, the charging control module executes an impedance calculation to obtain a first battery voltage corresponding to a first predetermined current and a second battery voltage corresponding to a second predetermined current of the battery module, and calculates a compensation impedance according to the first battery voltage and the second battery voltage, and the charging control module sets a maximum charging voltage according to the compensation impedance, executes a CV charging to the battery module, and determines whether a current variation of the charging current is larger than a threshold value, when the current variation is larger than the threshold value, the charging control module re-executes the impedance calculation to recalculate the compensation impedance in the CV charging mode, and updates a setting value of the maximum charging voltage according to the recalculated compensation impedance.

9. The portable electronic device according to claim 8, wherein the charging control module includes:
   a power convert circuit receiving a direct current (DC) power and converting the DC power to a working power supply;
   a power switch coupled to the power convert circuit to receive the working power supply, switching according to a control signal, and controlling the working power supply provided to the battery module; and
   a control circuit controlling power conversion of the power convert circuit, and providing the control signal to control the power switch, wherein the control circuit detects the battery voltage and the charging current of the battery module as a basis of adjusting the control signal.

10. The portable electronic device according to claim 8, wherein when the charging control module executes the impedance calculation, the charging control module charges the battery module with the first predetermined current during a first period, detects the battery voltage in the first period as the first battery voltage, and detects the charging current in the first period as a first charging current; and the charging control module charges the battery module with the second predetermined current during a second period, detects the battery voltage in the second period as the second battery voltage, and detects the charging current in the second period as a second charging current.

11. The portable electronic device according to claim 10, wherein the charging control module stops charging the battery module in the first period, to take the first battery voltage detected in the first period as an actual voltage of the battery module.

12. The portable electronic device according to claim 10, wherein the charging control module calculates a voltage difference between the first battery voltage and the second battery voltage, calculates a current difference between the first charging current and the second charging current, and calculates the compensation impedance according to the voltage difference and the current difference.

13. The portable electronic device according to claim 8, wherein the charging control module calculates product of the charging current and the compensation impedance to obtain a compensation voltage and sets the maximum charging voltage to be as a sum of a full charge voltage and the compensation voltage.

14. The portable electronic device according to claim 8, wherein the charging control module determines whether the battery voltage is greater than or equals to a full charge voltage and determines whether the input current is less than a maximum current threshold value;
   the charging control module determines that the portable electronic device operates at the CV charging mode when the battery voltage is greater than or equals to the full charge voltage and the input current is less than the maximum current threshold value; and
   the charging control module determines that the portable electronic device does not operate at the CV charging mode when the battery voltage is less than the full charge voltage or the input current is greater than or equals to the maximum current threshold value.

15. The portable electronic device according to claim 8, wherein the charging control module determines whether the charging current meets a full charge condition, and stops charging the battery module when the charging current meets the full charge condition.

* * * * *